United States Patent
Soudier et al.

(10) Patent No.: US 9,981,882 B2
(45) Date of Patent: May 29, 2018

(54) SILICO-ALUMINATE CONTAINING AGGREGATES FOR PRODUCTION OF MONOLITHIC REFRACTORY COMPOSITIONS, THEIR METHOD OF PRODUCTION AND THEIR USE

(71) Applicant: Calderys France, Issy-les-Moulineaux (FR)

(72) Inventors: Jérôme Soudier, Vaux en Bugey (FR); Camille Dromain, Lyons (FR)

(73) Assignee: Calderys France, Sezanne (FR)

( * ) Notice: Subject to any disclaimer, the term of this patent is extended or adjusted under 35 U.S.C. 154(b) by 0 days. days.

(21) Appl. No.: 15/103,966

(22) PCT Filed: Dec. 12, 2014

(86) PCT No.: PCT/EP2014/077601
§ 371 (c)(1),
(2) Date: Jun. 13, 2016

(87) PCT Pub. No.: WO2015/086829
PCT Pub. Date: Jun. 18, 2015

(65) Prior Publication Data
US 2016/0318814 A1    Nov. 3, 2016

(30) Foreign Application Priority Data

Dec. 13, 2013   (EP) .................................. 13290315

(51) Int. Cl.
*C04B 18/02*    (2006.01)
*C04B 38/00*    (2006.01)
(Continued)

(52) U.S. Cl.
CPC ............ *C04B 38/009* (2013.01); *C04B 35/10* (2013.01); *C04B 35/1015* (2013.01);
(Continued)

(58) Field of Classification Search
CPC ..... C04B 35/18; C04B 35/101; C04B 35/111; C04B 2235/3418
(Continued)

(56) References Cited

U.S. PATENT DOCUMENTS 2,272,618 A * 2/1942 Fessler et al. ........ C04B 35/101
501/153
3,642,505 A * 2/1972 Bakker ................. C04B 35/185
501/128
(Continued)

FOREIGN PATENT DOCUMENTS

JP       2002-316869       10/2002
WO       WO 01/90030 A1    11/2001
WO       WO/2012/154357  * 11/2012 ........... C04B 35/185

OTHER PUBLICATIONS

Liu et al. Low cost porous mullite-corundum ceramics by gelcasting. Journal of Materials Science 36 (2001) 3687-3692.*
(Continued)

*Primary Examiner* — Noah S Wiese
(74) *Attorney, Agent, or Firm* — Finnegan, Henderson, Farabow, Garrett & Dunner, LLP

(57) ABSTRACT

The present invention relates to a porous aggregate, comprising $Al_2O_3$, $SiO_2$ and optionally $Fe_2O_3$, having a $d_{50}$ of equivalent pore diameter between 1 μm or more and 50 μm or below and a total porosity between 20% and 60%, for use in the formation of monolithic refractories. Also part of the invention is a method of formation for said aggregates, their use in the formation of monolithic refractories and monolithic refractories comprising such aggregates.

27 Claims, 2 Drawing Sheets

Figure 1:
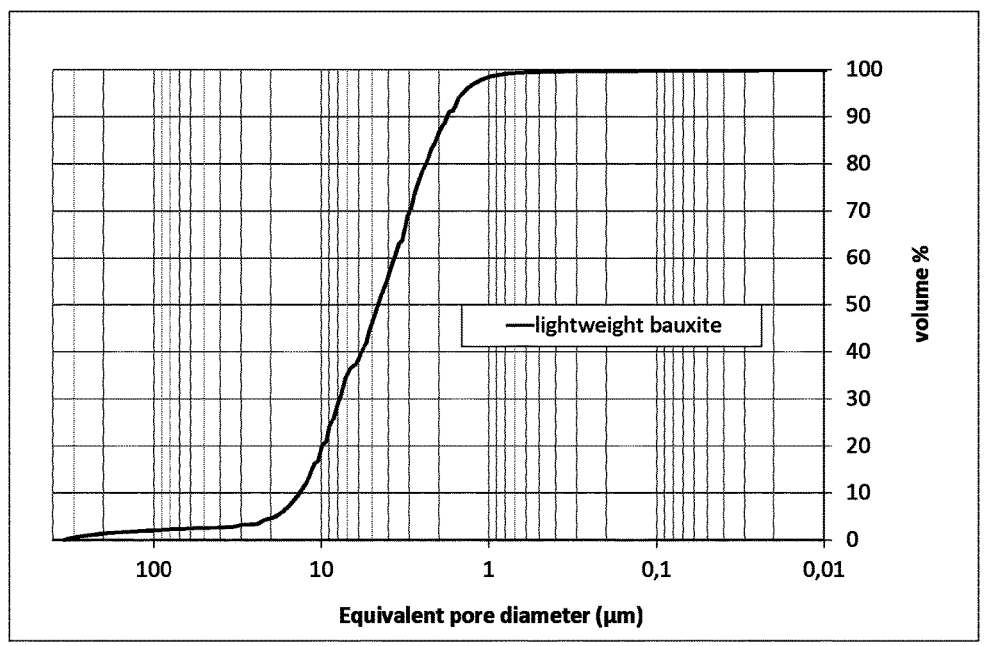

(51) Int. Cl.
    *C04B 35/101*     (2006.01)
    *C04B 35/185*     (2006.01)
    *C04B 35/626*     (2006.01)
    *C04B 35/636*     (2006.01)
    *C04B 35/66*     (2006.01)
    *C04B 41/82*     (2006.01)
    *C04B 41/00*     (2006.01)
    *C04B 41/47*     (2006.01)
    *C04B 35/10*     (2006.01)
    *C04B 35/632*     (2006.01)

(52) U.S. Cl.
CPC ...... *C04B 35/185* (2013.01); *C04B 35/62625* (2013.01); *C04B 35/62675* (2013.01); *C04B 35/62695* (2013.01); *C04B 35/632* (2013.01); *C04B 35/636* (2013.01); *C04B 35/66* (2013.01); *C04B 41/009* (2013.01); *C04B 41/47* (2013.01); *C04B 41/82* (2013.01); *C04B 2235/3217* (2013.01); *C04B 2235/3218* (2013.01); *C04B 2235/3272* (2013.01); *C04B 2235/349* (2013.01); *C04B 2235/3418* (2013.01); *C04B 2235/3463* (2013.01); *C04B 2235/5427* (2013.01); *C04B 2235/5436* (2013.01); *C04B 2235/5463* (2013.01); *C04B 2235/77* (2013.01); *C04B 2235/80* (2013.01); *C04B 2235/9607* (2013.01)

(58) Field of Classification Search
USPC .................................................. 501/128, 153
See application file for complete search history.

(56) References Cited

U.S. PATENT DOCUMENTS 9,289,707 B2 *   3/2016   Izumi ..................... B01D 39/14
9,309,155 B2 *   4/2016   Nahas
2014/0302978 A1 *  10/2014   Pyzik ...................... B01J 21/16
                                                                                                            501/127

OTHER PUBLICATIONS

International Search Report and Written Opinion dated Feb. 23, 2015, in International Application No. PCT/EP2014/077601 (10 pgs.).
Database WPI, Week 200304, Thomson Scientific, London, GB, XP002735765, Oct. 31, 2002 (2 pages).

* cited by examiner

SILICO-ALUMINATE CONTAINING AGGREGATES FOR PRODUCTION OF MONOLITHIC REFRACTORY COMPOSITIONS, THEIR METHOD OF PRODUCTION AND THEIR USE

CLAIM FOR PRIORITY

This application is a U.S. national phase entry under 35 U.S.C. § 371 from PCT International Application No, PCT/EP2014/077601, filed Dec. 12, 2014, which claims the benefit to and priority of EP Application No. 13290315.4, filed Dec. 13, 2013, the subject matter of both of which is incorporated herein by reference.

FIELD OF THE INVENTION

The present invention relates to methods for preparing porous alumina-containing aggregates. The invention further relates to porous alumina aggregates produced by such methods and their use in the preparation of monolithic refractory compositions. Also part of the present invention are particulate mixtures for use in the formation of porous aggregates.

BACKGROUND OF THE INVENTION

Refractories are materials having properties that make them suitable for use as heat-resistant barriers in high temperature applications. Unshaped refractory materials have the ability to form a joint-less lining, and are often referred to as monolithic. These materials are useful for example as linings for cupola hearths and siphons, blast furnaces, main secondary and tilting runners, and more generally as vessels or vessel spouts, ladles, tundishes, reaction chambers and troughs that contain, direct the flow of, or are suitable for facilitating industrial treatment of liquid metals and slags, or any other high temperature liquids, solids or gases.

Dense materials have a higher thermal conductivity due to their increased density. Reduction of density of monolithic refractories has therefore been employed to decrease thermal conductivity. This has previously been achieved in various ways:

Incorporation of aggregates with lower density into the refractory composition, such as high silica containing materials has been used. This however leads to a reduction in refractoriness and limits their use to low temperature applications.

Incorporation of lightweight aggregates with high porosity, such as for example vermiculite, bubble alumina, or light chamotte, has also been used. However the pore size distribution of such aggregates is such that a high proportion of pores of 100 µm or above are present, having a negative impact on the physical properties and infiltration resistance to slag and/or molten metal.

Incorporation of porosity into the refractory matrix by use of additional water or pore former such as polymeric fine particles or saw dust is also known. In this case the additional porosity leads to a drastic reduction in both infiltration resistance and compressive strength.

Also, some insulating refractories have been formed of hollow globules of alumina held by a suitable bond. However, alumina has a relatively high temperature conductivity compared to other materials such as mullite (alumina-silica) and, therefore, its insulation properties are not fully satisfactory.

U.S. Pat. No. 4,927,611 discloses a process for obtaining lightweight magnesia clinker which exhibits high apparent porosity. However, the process of obtaining such a refractory material is economically disadvantageous, in particular compared to alumina-silica refractories.

Some parameters such as density, open porosity and bulk density of the refractory have to be determined in order to assess the mechanical properties of the material. One disadvantage of conventional insulating refractory compositions with high alumina and low silica content is that, after dry pressing, adequate handling properties are lacking. This is particularly problematic in case of porous alumina refractories. A refractory material with a suitable cold compression strength is therefore desirable.

U.S. Pat. No. 4,992,397 discloses a refractory castable composition consisting of granular refractory aggregates and a cement binder comprising 55 to 80 wt.-% amorphous silica. However this refractory does not offer high heat resistance in comparison with alumina-based refractories.

U.S. Pat. No. 6,238,618 B1 discloses a method for producing porous mullite-based ceramic materials suitable for filtration purposes. This material however exhibits high permeability which is detrimental for its use as a refractory composition. Furthermore, porous lightweight aggregates are poorly bonded, which leads to low abrasion resistance.

EP 2 060 640 A1 discloses methods for the formation of lightweight porous refractory pellets formed by addition of carbonate-based reaction compounds and partner compounds, which upon pelletisation react to form gaseous $CO_2$ which leads to the presence of open and closed pores in the final product. The pores formed have diameters of 200 µm and more, leading to pellets having low abrasive resistance and low mechanical resistance.

The size and distribution of hollow structures (such as pores) within the refractory compositions determines the degree of physical strength of the material at high temperatures. The conventional methods of producing refractory materials do not allow for a simple, economically viable and controlled porosity-formation process. The state of the art therefore represents a problem.

It is an aim of the present invention to provide a light product presenting physical properties (compressive strength, abrasion resistance, refractoriness under load etc.) that are not or only slightly decreased within acceptable limits when compared to the same non-lightened monolithic but with a lower thermal conductivity.

It is a further aim to use the said lightened monolithic for the same application than the non-lightened monolithic, such that infiltration to slag and/or molten metal is not or only slightly reduced within certain limits that do not prevent the use for the target application.

SHORT DESCRIPTION OF THE INVENTION

The present invention is defined in the appended claims.

In particular, the present invention is embodied by a porous aggregate comprising from 70 to 95 wt.-% $Al_2O_3$, from 3 to 10 wt.-% $SiO_2$ and optionally up to 5 wt.-% $Fe_2O_3$. The porous aggregate according to one embodiment of the present invention may have a $d_{50}$ of equivalent pore diameter of 1 µm or above and 50 µm or below, and/or a $d_{10}$ equivalent pore diameter of 30 µm or below, or of 20 µm or below, or of 15 µm or below. For example, the $d_{50}$ of equivalent pore diameter may be from 2 µm to 40 µm, such as from 5 µm to 30 µm, or 20 µm or below. According to one embodiment of the present invention, the porous aggregate may have an open porosity of 20% or more and 60% or less, and/or a total porosity between 20% and 60%. According to a further embodiment of the present invention, the porous aggregate may have an apparent density of 2.5 g·cm$^{-3}$ or less, such as for example 2.4 g·cm$^{-3}$ or less or 2.3 g·cm$^{-3}$ or less or 2.2 g·cm$^{-3}$ or less.

As used herein, the aggregates according to the invention are silico-aluminate aggregates.

According to one specific embodiment of the present invention, the porous aggregates may further be coated with a polymer and as a result will have an open porosity of 20% or less, such as for example 15% or less or for example 10% or less. The said polymer may be selected from the group consisting of thermosetting binding agents, thermo-hardening binding agents, multi-component reacting binding agents and petroleum by-product polymers such as hydrocarbon molecules containing between twenty and forty carbon atoms or wax.

According to one specific embodiment of the present invention, the porous aggregate may have corundum and mullite as primary phases.

Also part of the present invention is a method of preparation for porous aggregates of the invention, comprising the steps of providing a particulate mixture of a pulverised alumina containing base material, a pore former and a metal hydroxide; addition of a binder to said particulate mixture in a pelletiser in order to obtain a pelletised mixture; and firing of the pelletised mixture obtained at the end of the previous step in order to obtain a porous silico-aluminate aggregate. In one specific embodiment of the present invention, the method may comprise an additional step of coating the fired pellets obtained at the end of the previous step with a polymer, which may be selected from the group consisting of thermosetting binding agents, thermo-hardening binding agents, multi-component reacting binding agents and petroleum by-product polymers. In one embodiment, the polymer may be hydrocarbon molecules containing between twenty and forty carbon atoms such as a wax or a hydrocarbon containing thermosetting compound.

According to one embodiment of the present invention, the aggregates obtained according to the method of the invention retain a porosity of 20% or above when subsequently fired at temperatures up to 1300° C. Furthermore, according to one further embodiment of the present invention, the aggregates obtained according to the method of the invention retain a $d_{50}$ of equivalent pore diameter when subsequently fired at temperatures up to 1300° C.

According to one embodiment of the present invention, the pulverised alumina containing base material may be selected from one or more silico-aluminates, pure alumina and mixtures thereof. According to a further embodiment of the present invention, the pulverised alumina containing base material for use in the method may comprise a calcined bauxite having a $d_{90}$ of about 200 µm, or of between 100 µm and 300 µm, such as between 150 µm and 250 µm, and a $d_{50}$ of 45 µm or less, and/or the pulverised bauxite may comprise greater than 80 wt.-% $Al_2O_3$, less than 10 wt.-% $SiO_2$ and less than 5 wt.-% $Fe_2O_3$.

According to one embodiment of the present invention, the pore former used in the method may be selected from the group consisting of carbohydrates, carbon black, polymer particles, cereal flour and mixtures thereof. For example, the pore former may be a monosaccharide or a polysaccharide having a $d_{90}$ of 150 µm or less and/or a $d_{50}$ of 45 µm.

According to one embodiment of the present invention, the metal hydroxide used may be selected from the group consisting of aluminium hydroxide, aluminium oxide hydroxide, hydrated alumina and mixtures thereof. The metal hydroxide used in the method may have a $d_{90}$ of 60 µm, or of between 30 µm and 100 µm, such as between 45 µm and 80 µm, and a loss on ignition at 1000° C. of 40% or less.

According to one embodiment of the present invention, the proportions of the constituents of the particulate mixture for use in the method may be from 65 to 90 wt.-% pulverised alumina containing base material, from 5 to 20 wt.-% pore former and from 5 to 20 wt.-% metal hydroxide.

According to one embodiment of the present invention, the amount of binder added to the particulate mixture may be no more than 15 wt.-%, such as for example from 2 to 12 wt.-% or from 5 to 10 wt.-%. The binder may either be a liquid binder, such as for example a liquid organic binder or water, or a mixture of a solid binder and water, that can react together to form a gel, such as for example cellulose.

According to one embodiment of the present invention, the firing may be carried out at a temperature of 1200° C. or more, for a duration of 2 hours or more.

Also part of the present invention is the particulate mixture for use in the method of formation according to the invention, the particulate mixture consisting of from 65 to 90 wt.-% pulverised alumina containing base material, from 5 to 20 wt.-% pore former and from 5 to 20 wt.-% metal hydroxide.

The present invention further extends to the use of the porous aggregates of the invention for the production of monolithic refractory compositions. According to one embodiment, the porous aggregate may be used in such an amount that it forms 60 wt.-% or less of the obtained monolithic refractory composition. According to one embodiment, the porous aggregate may be used in such an amount such that the finally obtained monolithic refractory composition comprises 70 wt.-% or more $Al_2O_3$, 20 wt.-% or less $SiO_2$ and 5 wt.-% or less $CaO$. The obtained monolithic refractory composition may have a density of 2.8 t·m$^{-3}$ or below, such as for example 2.7 t·m$^{-3}$ or below or 2.6 t·m$^{-3}$ or below at 800° C. and/or a thermal conductivity of 3 W·m$^{-1}$·K$^{-1}$ or less.

Also part of the present invention are monolithic refractory compositions comprising porous aggregates of the present invention.

SHORT DESCRIPTION OF THE FIGURE

Figure 2:
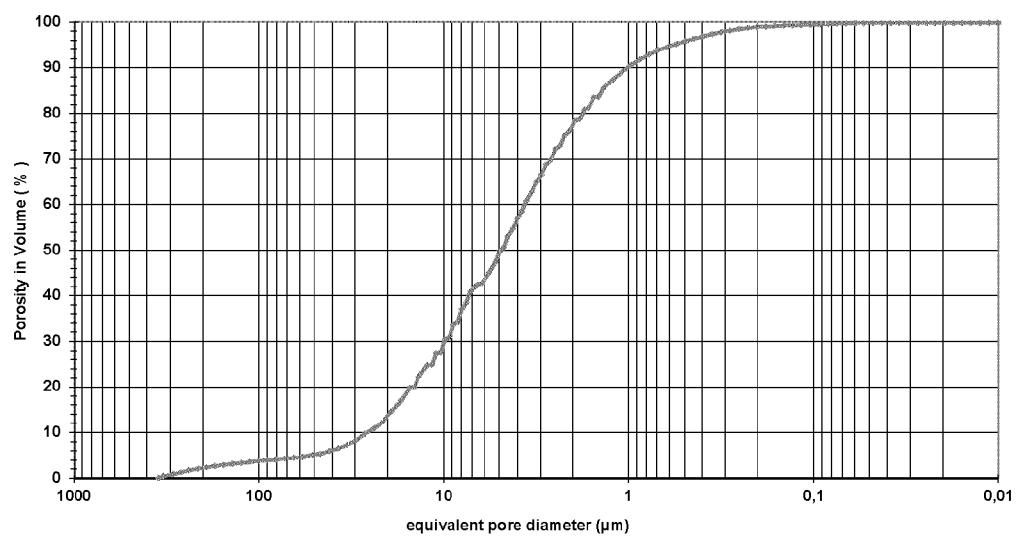

The invention will be further illustrated by reference to the following figures:

FIGS. 1 and 2 represent pore size distribution curves as measured in porous aggregate pellets according to the present invention.

It is understood that the following description and references to the figures concern exemplary embodiments of the present invention and shall not be limiting the scope of the claims.

DETAILED DESCRIPTION OF THE INVENTION

The present invention according to the appended claims provides porous aggregates for use in the formation of refractory compositions, a method for forming said porous aggregates, a composition provided in said method, as well as the use of the porous aggregates in the formation of monolithic refractories.

The porous aggregates are alumina based silica containing aggregates. They may comprise from 75 to 95 wt.-% $Al_2O_3$, such as from 78 to 92 wt.-% $Al_2O_3$, or from 80 to 90 wt.-%

Al$_2$O$_3$, such as for example 85 wt.-% Al$_2$O$_3$ or more. They may further comprise from 3 to 10 wt.-% SiO$_2$, such as between 4 to 8 wt.-% SiO$_2$, or from 4.5 to 6 wt.-% SiO$_2$, such as for example 5 wt.-% SiO$_2$ or more. They may also optionally comprise other metal oxides, such as for example no more than 5 wt.-% Fe$_2$O$_3$, or no more than 3 wt.-% Fe$_2$O$_3$. According to one embodiment, the porous aggregates may further comprise no more than 5 wt.-% TiO$_2$, or no more than 3 wt.-% TiO$_2$.

The porous aggregates according to the present invention may have a d$_{50}$ of the equivalent pore diameter of 50 μm or less, such as for example 30 μm or less, or 15 μm or less, or even 10 μm or less. As used herein, the pore volume, pore volume distribution and equivalent pore diameter being measured by mercury intrusion porosimetry method (ASTM D4404-10).

The porous aggregates according to the present invention may have an open porosity of 20% or more, such as 25% or more, and a total porosity of from 20% to 60%, for example from 25% to 50%, or from 30% to 45%, such as about 40% or more. As used herein, the open porosity as well as total porosity is measured by the Archimedes principle (ASTM C20).

The porous aggregates according to the present invention may have an apparent density of 2.5 g·cm$^{-3}$ or less, such as for example 2.1 g·cm$^{-3}$ or less, or 2.0 g·cm$^{-3}$ or less, or even 1.8 g·cm$^{-3}$ or less. In one embodiment, the apparent density of the porous aggregates according to the present invention may be from 1.5 to 2.5 g/cm$^3$, or from 1.0 to 2.2 g/cm$^3$. As used herein, the apparent density is also measured by the Archimedes principle (ASTM C20).

The porous aggregates according to the present invention may in one embodiment be coated with a polymer. Incorporation of aggregates with open porosity induces a higher requirement for casting water during placement of the refractory monolithic. This additional water leads to a rise in uncontrolled porosity and to a deterioration of the key monolithic properties (mechanical strength, abrasion resistance, infiltration resistance to molten slag/metal). The coating provided on the aggregates allows to avoid this drawback and to use same level of water than for castables comprising non porous aggregates. By coating the porous aggregates, this may be helpful in order to prevent water absorption into the aggregates. After coating the porous aggregates with a polymer, many previously open pores become closed or internal pores, and open porosity may be reduced to 20% or below, or to 10% or below, such as for example 5% or below. In one embodiment, the open porosity may be from 1 to 20%, or from 2 to 10%, or from 3 to 5%. The coating prevents water absorption during monolithic casting. This may avoid the need for providing additional water addition to reach equivalent flow and placement properties.

The porous aggregates according to the present invention may be present in the shape of individually shaped pellets, such as pellets obtained from a pelletiser known to the skilled person in the art. The pellets may have a pellet diameter of 1 mm, or of 2 mm, or for example anywhere within the range from 0.5 mm to 20 mm, such as for example 5 mm.

Unless otherwise stated, the equivalent particle diameters (d$_{90}$, and d$_{50}$-values) referred to herein are as measured in a well known manner by sedimentation of the particulate material in a fully dispersed condition in an aqueous medium using a Sedigraph 5100 machine as supplied by Micromeritics Instruments Corporation, Norcross, Ga., USA (web-site: www.micromeritics.com), referred to herein as a "Micromeritics Sedigraph 5100 unit". Such a machine provides measurements and a plot of the cumulative percentage by weight of particles having a size, referred to in the art as the 'equivalent spherical diameter' (esd), less than given esd values. The mean particle size d$_{50}$ is the value determined in this way of the particle esd at which there are 50% by weight of the particles which have an equivalent spherical diameter less than that d$_{50}$ value.

According to one aspect of the present invention, the porous aggregates may be formed using the method of the invention. The invention therefore provides a method for preparing pelletised porous silico-alumina aggregates to form refractory compositions such as monolithic refractory compositions for use, for example, as linings of metallurgical vessels. The porous silico-alumina aggregates obtained according to the method of the present invention may be used such that they constitute the bulk of a formed monolithic refractory composition, or such that they constitute only a portion of a monolithic refractory composition comprising further constituents, such as for example 60 wt.-% or less of the said formed monolithic refractory composition, or 50 wt.-% or less of the formed said monolithic refractory composition, such as for example from 5 wt.-% to 40 wt.-% or from 20 wt.-% to 30 wt.-% of the said monolithic refractory composition.

According to the present invention, it has been found that porous silico-alumina aggregates for forming refractory compositions may be obtained by providing a pulverised alumina containing base material, a pore former and metal hydroxide as components of a particulate mixture. A binder is then added to said particulate mixture in a pelletiser and it is subsequently pelletised in said pelletiser. The obtained pellets are then fired in order to obtain the porous aggregates according to the present invention.

In one embodiment, the particulate mixture used in the method may comprise or consist of 65 wt.-% to 90 wt.-% pulverised alumina containing base material, 5 wt.-% to 20 wt.-% pore former and 5 wt.-% to 20 wt.-% metal hydroxide, based on the total weight of the mixture. Depending on the nature of the pulverised alumina containing base material, the amount used may vary from 60 wt.-% to 80 wt.-%, such as for example 70 wt.-% or 72 wt.-% pulverised alumina containing base material or more. The amount of pore former used may vary, depending on the nature of the pore former, and may vary from 8 wt.-% to 18 wt.-%, or from 10 wt.-% to 15 wt.-%, such as for example 14 wt.-% or more. The amount of metal hydroxide used may vary, depending on the nature of the pore former, and may vary from 8 wt.-% to 18 wt.-%, or from 10 wt.-% to 15 wt.-%, such as for example 14 wt.-% or more.

The said alumina containing base material may be selected from the group consisting of silico-aluminates, of silico-aluminate compound mixtures, mixtures containing pure alumina, silico-aluminate compounds, and mixtures thereof. The silico-aluminates may be selected from the group of raw clays (such as kaolinite, montmorillonite smectite, pyrophyllite, halloysite, illite, vermiculite, palygorskite), calcined clays (such as metakaolin or chamotte), raw or synthetic aluminosilicates (such as kyanite, silimanite or andalusite), raw or calcined bauxite, mixtures of pure alumina with raw or synthetic siliceous compounds (such as quartzite, tridymite, cristobalite, fused silica, sand, fume silica, silicon carbide), and mixtures thereof.

In one embodiment of the present invention, the alumina based starting material is a pulverised calcined bauxite or a mixture of alumina containing material and calcined bauxite having a $d_{90}$ of 200 μm or less and a $d_{50}$ of 45 μm and/or a raw bauxite having a $d_{90}$ of 1000 μm and a $d_{50}$ of 500 μm or lower, and/or wherein the pulverised bauxite comprises 80 wt.-% $Al_2O_3$ or more, 10 wt.-% $SiO_2$ or less and 5 wt.-% $Fe_2O_3$ or less after calcination. In one embodiment, the pulverised bauxite comprises 82 wt.-% $Al_2O_3$ or more, such as for example 85 wt.-% $Al_2O_3$ or more, 9 wt.-% $SiO_2$ or less, such as for example 8 wt.-% $SiO_2$ or less and 5 wt.-% $Fe_2O_3$ or less, such as for example less than 4 wt.-% $Fe_2O_3$ or less, or 3 wt.-% $Fe_2O_3$ or less. In one embodiment, the pulverised bauxite comprises about 89 wt.-% $Al_2O_3$, about 6.5 wt.-% $SiO_2$ and about 1.5 wt.-% $Fe_2O_3$.

In order to obtain the porous silico-aluminate aggregates according to the present invention, the particulate mixture is placed into a pelletiser and mixed with a binder. By the action of the pelletiser, pellets of the particulate mixture are obtained. The amount of binder added to the particulate mixture may be 8 wt.-% or less, such as for example 6 wt.-% or less, or for example 5 wt.-% or less, based on the total weight of the particulate mixture.

In a subsequent step, according to the invention the pellets are fired at a temperature of up to 1500° C., such as for example 1400° C. or less, or even at 1200° C. or less, such as for example about 1000° C. or about 1100° C., for a duration of up to 8 hours, such as from 3 to 7 hours or about 5 hours.

In a further step, the fired pellets may optionally be coated with a polymer. This polymer may be selected from solid thermoplastic agents, thermohardening (thermo-setting) binding agents and liquid, optionally multi-component, binding agents. The binding agents may, for example, be selected from the group consisting of cellulose, cellulose of butyrate acetate, alkylds, phenolic binders, polyester binders (such as polycaprolactone or polyethylene terephthalate), vinyl-polymers (such as polybutadiene, polystyrene, polyvinyl chloride, polyvinyl alcohol, polyacrylonitrile, styrene-butadiene-acrylonitrile, polyethylene or polypropylene), polyurethane binders, linear hydrocarbons having 20 or more carbon atoms, aromatic alkanes, glycols (such as PEG 1000), polylactic acids or polyimides. The liquid, optionally multi-component, binding agents may, for example, be selected from the group comprising alkyds (with possible addition of colbalt-derived catalysts for adjustment of reticulation speed), phenolics (with possible addition of catalysts), polyesters (with possible addition of catalysts), polyurethanes (polyisocianate reticulating due to the presence of moisture, or reticulating due to the addition of a second liquid component such as polyol and presence of a catalysts such as amine) or epoxy (reticulating due to the presence of a second liquid component such as amine). The polymer for coating may also be a hydrophobic polymer, such as for example a wax. Coating of the pellets with a hydrophobic polymer may avoid or reduce water absorption into the pellet aggregates. The obtained porous aggregate may represent the starting material for forming monolithic refractory compositions, for example as linings in metallurgical vessels.

The step of coating of porous aggregates with polymers as described herein is also part of the invention as described herein. Both coated and uncoated pellets are considered part of the present invention.

The coated porous aggregates can be obtained by simple application of a polymer to the aggregates while they are rotating in a special device such as pelletiser, mixer, heinrich mixer or concrete mixer. The rotation of the said aggregates in the mixer prevents any lump formation. The said mixer rotation is stopped when the coating is hard and homogeneous.

The main constituent of the particulate mixture for forming the aggregates according to the present invention may be pulverised bauxite. It has been found that calcination of pulverised bauxite prior to use in the particulate mixture contributes to the stability of the aggregate's porosity, especially at high temperatures (≥1400° C.). As mentioned above, it may represent from 25 wt.-% to 90 wt.-% of the total particulate mixture, such as for example from 50 wt.-% to 70 wt.-%.

The bauxite for use in the method of the present invention may have a grain size distribution such that the $d_{90}$ is 200 μm or less, such as for example 100 μm or less, or even 80 μm or less. Moreover, the grain size distribution may be such that 50 wt.-% of the particles have a particle diameter below 45 μm, or 60 wt.-% of the particles have a particle diameter below 45 μm, or even 70 wt.-% of the particles have a particle diameter below 45 μm.

In order to form a refractory material with low temperature conductivity, the density of the material is preferably low, since high thermal conductivity is an inherent property of dense materials. Several approaches to reduce density of a refractory material have been previously proposed, for example by incorporation lightweight aggregates type such as light chamotte or vermiculite. However, this method confers low refractoriness and low resistance to abrasion when hot, the said aggregates having a low melting point. Moreover the pore size distribution of such aggregates presents a $d_{10}$ with high value. This high value indicates porosity with pores with a high diameter leading to low mechanical strength and low infiltration resistance if in contact with slag or liquid steel. According to the invention, the provision of a pore former in the particulate mixture, such as for example carbohydrates, allows the generation of binding strength during the initial agglomeration stage and the controlled formation of ultrafine porosity. The pore former may represent from 5 wt.-% to 20 wt.-% of the total particulate mixture. After pelletisation, the particulate mixture is fired at a temperature of 1500° C. or less, for a period of 2 hours or longer. The firing temperature results in the volatilization of the pore former, by which empty spaces (pores) of known size and distribution are generated. The porous silico-aluminate aggregate obtained by the method of the present invention may display an average pore size of 20 μm or less, such as 15 μm or less, or even 10 μm or less.

Another parameter that influences the mechanical properties of a porous aggregate is the porosity, which indicates the percentage of void spaces within the material. By means of addition of the pore former to the particulate mixture, the density of the obtained pellets, and therefore the final refractory lining can be influenced, as the amount and grain size distribution of the pore former such as carbohydrates is known.

The grain size distribution $d_{90}$ of a carbohydrate that may be used as a pore former according to the invention may be such that the $d_{90}$ is 100 μm or less, such as 80 μm or less. Moreover, the grain size distribution may be such that 50 wt.-% of the particles have a particle diameter below 45 μm, or 60 wt.-% of the particles have a particle diameter below 45 μm, or even 70 wt.-% of the particles have a particle diameter below 45 μm. According of the method of the invention, the pore former may have a loss on ignition of 99.9% at 1000° C.

A metal hydroxide is provided as part of the said particulate mixture in the method according to the invention. It contributes to the generation of ultrafine porosity. Additionally, it provides strength during the agglomeration and firing steps. The metal hydroxide may be selected from the group consisting of brucite (magnesium hydroxide), aluminium hydroxide, hydrated lime (calcium hydroxide), aluminium oxide hydroxide and hydrated alumina (such as hydratable alumina or ρ-alumina), and mixtures thereof. The said aluminium hydroxide may, for example, be selected from raw or synthetic gibbsite, bayerite, nordstrandite, doyleite. The aluminium oxide hydroxide may, for example, be selected from diaspore, boehmite, akdalaite. The metal hydroxide may represent from 5 wt.-% to 20 wt.-% of the particulate mixture used in the method according to the invention. The grain size distribution of the metal hydroxide for use in the method according to present invention is such that a $d_{90}$ is 60 μm or less, such as for example 50 μm or less. The ultrafine metal hydroxide of the invention may have a loss on ignition of 30% or more at 1000° C., such as for example 34% or more. Furthermore, in some embodiments, particulate metal carbonates such as $CaCO_3$ or $MgCO_3$ may be added to the metal hydroxide according to the present invention.

The porous silico-aluminate aggregates obtained according to the present method may have open porosity values of 20% or higher, such as for example 30% or higher, or for example 35% or higher, or for example 40% or higher. In one embodiment, the open porosity may be from 20 to 60%, such as from 30 to 50%.

In one embodiment, the method according to the present invention may comprise an additional coating step. After the firing of the pelletised mixture, the obtained pellets may be coated with a hydrophobic polymer, such as for example with a petroleum by-product polymer, such as a wax. This step may be useful in order to prevent water absorption by the aggregates. Water absorption by the aggregates during mixing is responsible of many drawbacks such as water casting increasing during the monolithic casting leading to increasing the porosity of the said monolithic after drying and thus leading to mechanical strength decreasing and/or infiltration resistance decreasing.

The particulate mixtures described above as employed in the method for forming porous aggregates also form part of the present invention.

The porous alumina aggregates according to the present invention may be used in the preparation of monolithic refractory compositions. In one embodiment, the porous aggregates may be used in such amount that they form 40 wt.-% or more of a final monolithic refractory compositions, such as for example 50 wt.-% or more, or 60 wt.-% or more of the total refractory composition. In one embodiment, the porous aggregates may be used in such an amount that they form the bulk of the final monolithic refractory composition.

The preparation of monolithic refractory compositions may require the addition of from 0.5 wt.-% to 25 wt.-% cementitious binder, such as for example, 5 wt.-% to 15 wt.-% or about 10 wt.-% calcium aluminate and/or calcium silicate cement. Further optional additions are colloidal alumina suspensions and/or colloidal silica suspensions used as liquid addition for preparation of an installable product, permitting the stiffening and setting of the castable mixture once installed by destabilisation of the colloidal dispersion and gellification; acids such as phosphoric acid which react with oxides or hydroxides such as magnesia and alumina or other impurities leading to cross reticulation; sodium silicate, reacting either with acids (causing setting by gellification of hydroxysilicates), salts (increasing viscosity of silicate solution and gel formation) or alkaline earth metal hydroxides (causing coagulation); aluminium phosphates hardening at a temperature greater than 100° C. or reacting at lower temperature with oxides such as magnesia forming a bond by creation of a Mg and/or P hydrates network; polysaccharide-based water soluble polymers; species which would cause the reticulation, polymerization or co-polymerization of organic components, when present, which are capable of being reticulated, polymerized or co-polymerized in the presence of said species; and hydration of a reactive alumina substantially free of calcium oxides known as hydratable alumina or ρ-alumina. All these additives help to achieve adequate handling and strength for castable materials. According to the present invention, the amount of cement used is such that the CaO-content in the final monolithic composition is 5 wt.-% CaO or less, such as for example 3 wt.-% CaO or less, or even 2 wt.-% CaO or less, such as for example from 0.1 to 5 wt.-% CaO or from 1 to 4 wt.-% CaO, or even about 2.5 wt.-% CaO, based on the total weight of the obtained monolithic refractory composition.

In order to form a monolithic refractory with the aggregates according to the present invention, a calcium alumina cement is admixed thereto in order to obtain an ultra-low cement formulation as known by the skilled person of the art. During the mixing, water is added in order to obtain a castable composition. Then, the said castable composition is cast in order to form a monolith, such as a vessel lining. After hardening, and an optional step of drying, the monolithic can be put in service. The placement can be done by casting as well as by gunning, shotcreting, spraycasting, ramming, troweling, self-flowing, or rodding.

There is a directly proportional correlation between a decrease in density and a reduction in thermal conductivity. The refractory material obtained according to the present invention may have a density of 2.8 t·m$^{-3}$ or below, such as 2.7 t·m$^{-3}$ or below, or even 2.6 t·m$^{-3}$ or below at 800° C. The method of the invention is advantageous since, despite having low density, the refractory composition according to the invention presents physical properties no more than 40% weaker when compared to the original composition, i.e. without addition of porous silico-aluminate aggregates.

EXAMPLES

Example 1

Porous alumina containing aggregates for use in monolithic refractory compositions according to the present invention were prepared. The porous alumina aggregates were prepared by mixing together the components as shown in Table I.

TABLE I

| Component | Amount | wt-% | size ($d_{50}$/diam.) | | LOI |
|---|---|---|---|---|---|
| Rotary kiln bauxite grade IMP IIA | 720 kg | 72 | 25 μm | 0 to 0.09 mm | 0.15% |
| Indal alumina hydrate RPF 14 | 140 kg | 14 | 4.5 μm | 99.5% < 45 μm | 34.5% |
| "Indian sugar" | 140 kg | 14 | 45 to 50 μm | 99.5% < 120 μm | 99.9% |

The bauxite used had the following chemical composition: $SiO_2$: 5.8 wt.-%; $Al_2O_3$: 87.0 wt.-%; $TiO_2$: 3.7 wt.-%; $Fe_2O_3$: 1.9 wt.-%. "LOI" in Table I stands for "loss on ignition".

The porous alumina aggregate was obtained as follows. Rotary kiln bauxite grade IMP IIA—170 mesh (72 wt.-%), Indal Alumina hydrate RPF 14 (14 wt.-%) and ultrafine sugar (14 wt.-%) were mixed together for 3 minutes at low speed. Special care was taken in that no formation of sugar lumps had taken place. Sugar lumps form when the sugar is in storage for a long time or in a humid atmosphere. Short grinding in a bowl mill for 3 minutes was sufficient to remove any sugar lumps.

At the initial step of pelletisation, around 40% of the mixture was placed into a pan pelletiser. For this purpose, a pan pelletiser with a diameter of 2 meters was used at a speed about 100 rev/minute. The total capacity of the pan pelletiser used was 400 kg per shift. Once the pan pelletiser was activated, water was slowly added to the mixture. Sequentially small amounts of powder were added to the mixer, followed by a proportional amount of water (in total 8 wt.-% based on the whole weight of the particulate mixture). This stage was carried out entirely at room temperature. At the end of this process, small round pellets having a size in the range of 0.1 mm to 50 mm were formed. Next, the pellets were fired in a rotary kiln at a maximum temperature of 1500° C. for 3 hours, but were maintained at the maximum temperature for no more than 15 minutes.

Following granulation, the composition of the porous silico-aluminate aggregates were analysed, revealing the proportion of the every component, namely 89 wt.-% $Al_2O_3$, 5.25 wt.-% $SiO_2$, 1.86 wt.-% $Fe_2O_3$ and 2.83 wt.-% $TiO_2$.

FIG. 1 shows the pore size distribution of the obtained pellets. Measurements were made using the mercury intrusion porosimetry method according to ASTM D4404-10. The $d_{50}$ equivalent pore diameter measured was 4.6 µm, and the $d_{10}$ equivalent pore diameter measured was 13.7 µm. The apparent density of the obtained pellets was 2.09 g·cm$^{-3}$, and the open porosity 40.7%.

In order to prevent water absorption by the previously prepared pellets, coating with wax was carried out as follows. The pellets were heated up in oven at 250° C. for 10 hours. The hot aggregate pellets were then transferred to a rotating concrete mixer and 5 wt.-% to 10 wt.-% wax on the basis of the total weight of the pellets added. 6 wt.-% of wax were added to 3 to 6 mm and to 5 to 10 mm grade pellets respectively. Pellets of 1 to 3 mm grade required 7% wt.-% wax. Rotation of the mixer continued until complete cooling down of the pellets. In this form, the pellets could be stored for longer periods without atmospheric water absorption.

Example 2

Porous silico-aluminate aggregates were prepared for use in monolithic refractory compositions according to the present invention were prepared. The porous alumina aggregates were prepared by mixing together the components as shown in Table II:

TABLE II

| Component | Amount | wt-% | size ($d_{50}$/diam.) | | LOI |
|---|---|---|---|---|---|
| Gyana rasc bauxite pulverised | 720 kg | 72 | <45 µm | <0.1 mm | 0.15% |
| Aluminium hydroxide Martin OL-107 | 140 kg | 14 | 1.2 µm | <0.01 mm | 34.5% |
| Ultrafine icing sugar PS | 140 kg | 14 | 20 µm | <0.05 mm | 99.9% |

At the initial step of pelletisation, around 40% of the mixture was placed in a pan pelletiser with a capacity of approximatively 50 kg. Once the pan pelletiser was activated, water was slowly added to the mixture. Sequentially small amounts of powder were added to the mixer, followed by a proportional amount of water (in total 8 wt. % based on the whole weight of the particulate mixture). This stage was carried out entirely at room temperature. At the end of this process, small round pellets having a size in the range of 0.1 mm to 30 mm were formed. Next, the pellets were fired in a lab electric furnace at a maximum temperature of 1500° C. for 5 hours.

FIG. 2 shows the pore size distribution of the obtained pellets. Measurements were made using the mercury intrusion porosimetry method according to ASTM D4404-10. The $d_{50}$ equivalent pore diameter measured was 4.8 µm, and the $d_{10}$ equivalent pore diameter measured was 23 µm. The apparent density of the obtained pellets was 1.96 g·cm$^{-3}$, and the open porosity was 46.2%.

The invention claimed is:

1. A porous aggregate comprising from 70 to 95 wt.-% $Al_2O_3$, from 3 to 10 wt.-% $SiO_2$ and optionally up to 5 wt.-% $Fe_2O_3$, having a $d_{50}$ of equivalent pore diameter between 1 µm or more and 50 µm or below, a total porosity between 20% and 60%, and an apparent density of 2.5 g·cm$^{-3}$ or less.

2. A porous aggregate according to claim 1 having a $d_{10}$ equivalent pore diameter of 30 µm or below.

3. A porous aggregate according to claim 1 having an open porosity of 20% or more.

4. A porous aggregate according to claim 1, which is additionally coated with a polymers and which has an open porosity of 20% or less.

5. A porous aggregate according to claim 4, wherein said polymer is a petroleum by-product.

6. A porous aggregate according to claim 1 having corundum and mullite as primary phases.

7. A porous aggregate according to claim 1, which maintains a porosity of 20% or above and/or a $d_{50}$ of equivalent pore diameter of 50 µm or below through subsequent firings at a temperature of 1300° C. or below.

8. A method of preparation of a porous aggregate, comprising the steps of
   (a) providing a particulate mixture of
      (i) a pulverised alumina containing base material;
      (ii) a pore former; and
      (iii) metal hydroxide;
   (b) adding a binder to said particulate mixture in a pelletiser in order to obtain a pelletised mixture; and
   (c) firing the pelletised mixture obtained at the end of step (b) in order to obtain a porous aggregate;
   wherein the porous aggregate comprises from 70 to 95 wt.-% $Al_2O_3$, from 3 to 10 wt.-% $SiO_2$ and optionally up to 5 wt.-% $Fe_2O_3$, having a $d_{50}$ of equivalent pore diameter between 1 µm or more and 50 µm or below, a total porosity between 20% and 60%, and an apparent density of 2.5 g·cm$^{-3}$ or less.

9. A method according to claim 8, further comprising a step of (d) coating the fired pellets obtained at the end of step (c) with a hydrophobic polymer.

10. A method according to claim 9, wherein said polymer is a polymer selected from the group of thermosetting binding agents, thermo-hardening binding agents and multi-component reacting binding agents.

11. A method according to claim 8, wherein the pulverised alumina containing base material is selected from silico-aluminates, pure alumina, and mixtures thereof.

12. A method according to claim 8, wherein the pulverised alumina containing base material comprises a calcined bauxite having a $d_{90}$ of 200 μm and a $d_{50}$ of 45 μm or lower, and/or a raw bauxite having a $d_{90}$ of 1000 μm and a $d_{50}$ of 500 μm or lower and/or wherein the pulverised bauxite comprises greater than 80 wt.-% $Al_2O_3$, less than 10 wt.-% $SiO_2$ and less than 5 wt.-% $Fe_2O_3$ after calcination.

13. A method according to claim 8, wherein the said pore former is selected from the group of carbohydrates, carbon black, polymer particles, cereal flour and mixtures thereof.

14. A method according to claim 8, wherein the pore former is an ultrafine monosaccharide or polysaccharide having a $d_{90}$ of 150 μm or less and a $d_{50}$ of 45 μm or less.

15. A method according to claim 8, wherein the metal hydroxide is selected from the group aluminium hydroxide, aluminium oxide hydroxide and hydrated alumina.

16. A method according to claim 8, wherein the metal hydroxide has a $d_{90}$ of 60 μm and a loss on ignition at 1000° C. of 40% or less.

17. A method according to claim 8, wherein the mixture of step (a) consists of from 65 to 90 wt.-% pulverised alumina containing base material, from 5 to 20 wt.-% pore former and from 5 to 20 wt.-% metal hydroxide, based on the total weight of the mixture.

18. A method according to claim 8, wherein in step (b), the amount of binder added is no more than 15 wt.-%, on the basis of the total weight of the said particulate mixture, such as for example from 2 wt.-% to 10 wt.-%.

19. A method according to claim 8, wherein in step (c), the firing is carried out at a temperature of 1200° C. or more, for a duration of 2 hours or more.

20. A method of using the porous aggregate according to claim 1, in the preparation of a monolithic refractory composition.

21. A method according to claim 20, wherein the said porous aggregate forms 60 wt.-% or less of the said monolithic refractory composition.

22. A method according to claim 20, wherein the said monolithic refractory composition comprises 70 wt.-% or more $Al_2O_3$, 20 wt.-% or less $SiO_2$ and 5 wt.-% or less CaO.

23. A method according to claim 20, wherein the said monolithic refractory composition has a density of less than 2.8 $t \cdot m^{-3}$ at 800° C.

24. A method according to claim 20, wherein the said monolithic refractory composition has a thermal conductivity of 3 $W \cdot m^{-1} \cdot K^{-1}$ or less.

25. A monolithic refractory composition comprising the porous aggregate of claim 1.

26. A porous aggregate according to claim 4, wherein the polymer is selected from thermosetting binding agents, thermo-hardening binding agents, and multi-component reacting binding agents.

27. A porous aggregate according to claim 5, wherein the polymer is a petroleum by-product polymer that is a hydrocarbon containing from 20 to 40 carbon atoms per molecule.

\* \* \* \* \*